United States Patent
Peng et al.

(10) Patent No.: US 10,036,851 B1
(45) Date of Patent: Jul. 31, 2018

(54) WAVEGUIDE SYSTEM WITH POLARIZATION ROTATOR AND POLARIZATION SPLITTER

(71) Applicant: Seagate Technology LLC, Cupertino, CA (US)

(72) Inventors: Chubing Peng, Eden Prairie, MN (US); Michael Allen Seigler, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/480,743

(22) Filed: Apr. 6, 2017

Related U.S. Application Data (60) Provisional application No. 62/343,266, filed on May 31, 2016.

(51) Int. Cl.
| | |
|---|---|
| *G02B 6/00* | (2006.01) |
| *G02B 6/126* | (2006.01) |
| *G02B 6/125* | (2006.01) |
| *G02B 6/122* | (2006.01) |
| *G11B 5/48* | (2006.01) |
| *G02B 6/12* | (2006.01) |
| *G11B 5/00* | (2006.01) |

(52) U.S. Cl.
CPC .............. *G02B 6/126* (2013.01); *G02B 6/125* (2013.01); *G02B 6/1228* (2013.01); *G11B 5/4866* (2013.01); *G02B 2006/12061* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 9,070,386 B2 | 6/2015 | Peng et al. | |
| 9,123,374 B1 * | 9/2015 | Tohmon | G11B 5/4866 |
| 9,646,639 B2 * | 5/2017 | Van Orden | G11B 5/4866 |
| 2003/0002127 A1 * | 1/2003 | George | G02B 6/126 |
| | | | 359/246 |
| 2007/0286031 A1 | 12/2007 | Matsumoto | |
| 2009/0262608 A1 | 10/2009 | Kurita et al. | |
| 2012/0163750 A1 * | 6/2012 | Chen | G02B 6/105 |
| | | | 385/3 |
| 2013/0108212 A1 | 5/2013 | Peng et al. | |
| 2016/0246005 A1 * | 8/2016 | Liu | G01J 3/0218 |
| 2016/0379677 A1 * | 12/2016 | Van Orden | G11B 5/6088 |
| | | | 369/13.23 |
| 2017/0256277 A1 * | 9/2017 | Peng | G11B 5/4866 |

FOREIGN PATENT DOCUMENTS

EP          2355102          8/2011

* cited by examiner

*Primary Examiner* — Sung Pak
(74) *Attorney, Agent, or Firm* — Hollingsworth Davis, LLC (57) ABSTRACT

A polarization rotator rotates a portion of light received from an input surface to an orthogonal polarization. A polarization splitter is coupled to the polarization rotator and includes a channel waveguide section that transmits the rotated portion of the light towards an output surface. The splitter also includes a splitter waveguide separated from the channel waveguide section by a dielectric gap. The splitter waveguide couples an unrotated portion of the light away from a target region of the output surface.

20 Claims, 13 Drawing Sheets

WAVEGUIDE SYSTEM WITH POLARIZATION ROTATOR AND POLARIZATION SPLITTER

RELATED PATENT DOCUMENTS

This application claims the benefit of Provisional Patent Application Ser. No. 62/343,266 filed on May 31, 2016, to which priority is claimed pursuant to 35 U.S.C. § 119(e), and which is incorporated herein by reference in its entirety.

SUMMARY

The present disclosure is directed to a waveguide system with a polarization rotator and polarization splitter. In one embodiment, a polarization rotator rotates a portion of light received from an input surface to an orthogonal polarization. A polarization splitter is coupled to the polarization rotator and includes a channel waveguide section that transmits the rotated portion of the light towards an output surface. The splitter also includes a splitter waveguide separated from the channel waveguide section by a dielectric gap. The splitter waveguide couples an unrotated portion of the light away from a target region of the output surface.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to data storage devices that utilize magnetic storage media, e.g., disks. Data storage devices described herein use a particular type of magnetic data storage known heat-assisted magnetic recording (HAMR), also referred to as energy-assisted magnetic recording (EAMR), thermally-assisted magnetic recording (TAMR), and thermally-assisted recording (TAR). This technology uses an energy source such as a laser diode mounted to a recording head to create a small hotspot on a magnetic disk during recording. The heat lowers magnetic coercivity at the hotspot, allowing a write transducer to change magnetic orientation, after which the hotspot is allowed to rapidly cool. Due to the relatively high coercivity of the medium after cooling, the data is less susceptible to data errors due to thermally-induced, random fluctuation of magnetic orientation known as the superparamagnetic effect.

In current configurations, the laser diode may be mounted on a recording head in such a way that a transverse electric (TE) polarized light source excites a TE waveguide mode in the slider waveguide while a transverse magnetic (TM) polarized light source excites a TM waveguide mode. A near-field transducer (NFT) is designed to receive the light (often in TM mode) and achieves surface plasmon resonance in response. The surface plasmons are directed from the near-field transducer to a recording medium thereby creating a hotspot on the medium.

Light delivery with a TM mode eases the integration between a near-field transducer and a magnetic pole. This provides certain benefits such as lower sensitivity in the near-field transducer dimension, lower temperature rise in the magnetic pole, and lower sensitivity in slider lapping. However, a laser diode is usually TE polarized, with the electric field parallel to the diode waveguide junction. A TM polarized laser diode provides only limited choices in emission wavelength ($\lambda$) for optimization in the near-field transducer performance. Above light wavelength $\lambda=800$ nm, $\lambda=808$ nm is the only available choice in TM polarized diode laser. The next available TM light source will be $\lambda=1500$ nm. To surmount this dilemma, a polarization rotator is proposed, which converts a TE mode to a TM mode in the light delivery path.

A polarization rotator is usually imperfect, partially due to variations in fabricated device dimensions. For example, a TE-to-TM mode converter is intended to rotate an input TE mode into an output TM mode. In such a device, is quite normal that there will be ~10% TE mode residing in the output waveguide afterward. This residual TE mode is not preferred, as it can degrade recording performance. For example, residual TE mode can increase thermal background, increase NFT temperature, increase laser-induced local slider protrusion, etc. Embodiments described below utilize a cleanup filter that removes the residual TE mode from the light path. This TE-TM splitter/filter can be also used to monitor wafer health. For example, the TE mode filtered from the output can be measured and used as an indicator of total laser output.

Figure 1:
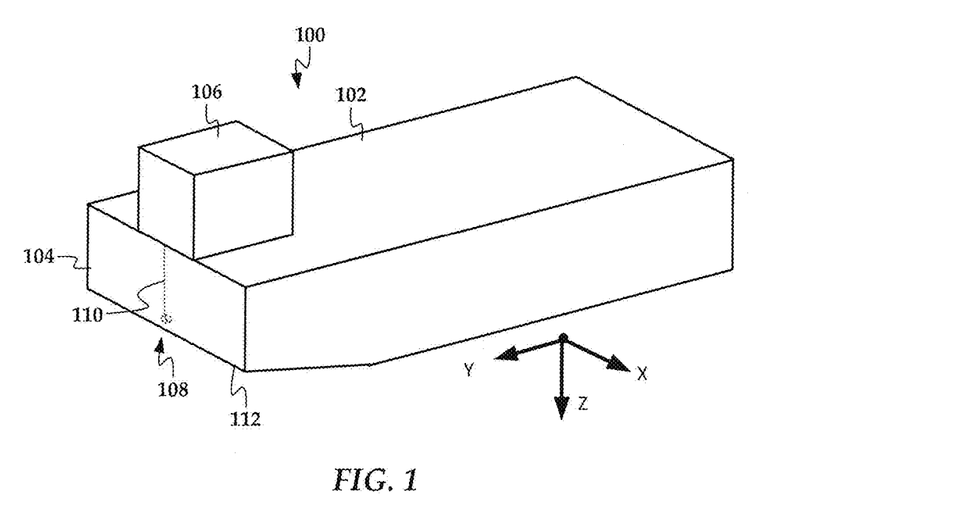
FIG. 1 is a perspective view of a slider assembly according to an example embodiment.

In reference now to FIG. 1, a perspective view shows a read/write head 100 according to an example embodiment. The read/write head 100 may be used in a magnetic data storage device, e.g., HAMR hard disk drive. The read/write head 102 may also be referred to herein interchangeably as a slider, write head, read head, recording head, etc. The read/write head 100 has a slider body 102 with read/write transducers at a trailing edge 104 that are held proximate to a surface of a magnetic recording medium (not shown), e.g., a magnetic disk.

The illustrated read/write head 100 is configured as a HAMR device, and so includes additional components that form a hot spot on the recording medium near the read/write transducer 108. These components include an energy source 106 (e.g., laser diode) and a waveguide 110. The waveguide 110 delivers electromagnetic energy from the energy source 106 to a near-field transducer that is part of the read/write transducers 108. The NFT achieves surface plasmon resonance and directs the energy out of a media-facing surface 112 to create a small hot spot on the recording medium.

Figure 2:
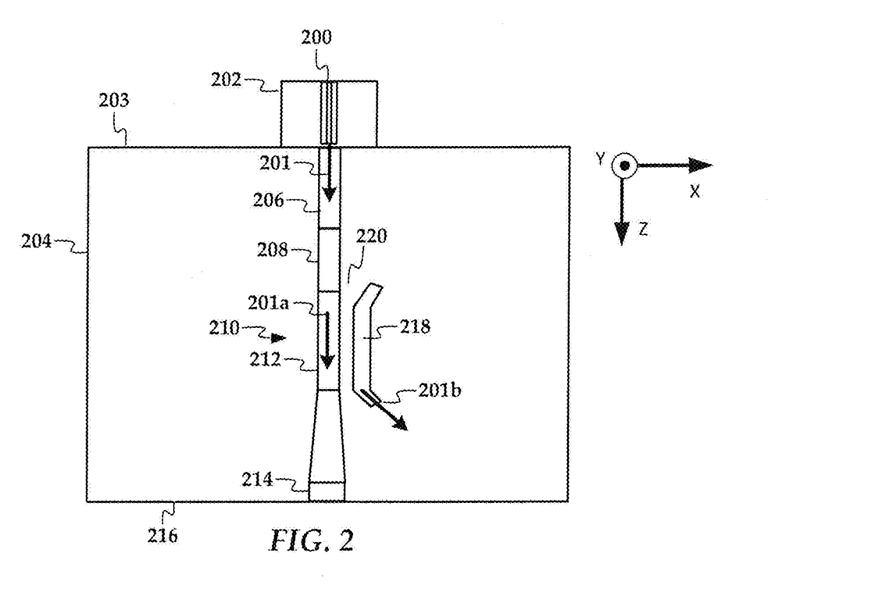
FIG. 2 is a cross-sectional view of a slider trailing edge according to according to an example embodiment.

In FIG. 2, a view of a slider trailing edge shows a light delivery configuration according to an example embodiment. A laser source 200, for instance, an edge-emitting laser diode, mounted on a submount 202, launches light 201 through input surface 203 on a slider 204 into a waveguide input coupler 206. The waveguide input coupler 206 extends away from the input surface 203 in a light-propagation direction (z-direction in this view).

A polarization rotator 208 is coupled to an end of the input waveguide 206, The polarization rotator performs a rotation of the light 201 propagating along the waveguide 206 to an orthogonal polarization, e.g., from TE-to-TM modes. A polarization splitter 210 is optically coupled to an end of the polarization rotator 208. The polarization splitter 210 includes a channel waveguide section 212 that transmits the rotated portion of the light 201a towards an output surface 216. For a HAMR recording head, this output surface 216 is a media-facing surface where a near-field transducer 214 is located. The rotated portion of the light excites the near-field transducer 214, thereby heating a recording medium.

The polarization splitter 210 also includes a splitter waveguide 218 separated from the channel waveguide section 212 by a gap 220 (e.g., a gap filled with dielectric material). The splitter waveguide 218 couples an unrotated portion 201b of the light away from a target region at the media-facing surface, e.g., a region where the near-field transducer 214 is located. The splitter waveguide 218 may be configured as a slot waveguide has two channels with a gap of low-index dielectric material between the channels (not shown). At least one of the channels is formed of a high-index material dielectric. The other channel may also be formed of a high-index material, or may be formed of a plasmonic metal layer.

In other embodiments, the splitter waveguide 218 may be configured as a single waveguide core that couples with the channel waveguide section 212 to support an odd, higher-order coupling mode (e.g., $TE_{10}$, $TE_{30}$, etc.) of the unrotated portion of the light received at the input surface. The odd-higher order coupling supporting birefringence with a corresponding odd, higher-order coupling mode of the rotated portion of the light (e.g., $TM_{10}$, $TM_{30}$, etc.).

In some embodiments, the slider body 204 may be about 180 µm long along the z-axis. To fit a light path on a slider of this size, the polarization splitter will be relatively short. In embodiments described below, an asymmetrical directional coupling system is used with a strong birefringence in the mode index between TE and TM modes. In such a coupling system, the waveguide dimension is selected to make the phase matching condition satisfied for only one polarization so that a complete cross-coupling is achieved. For the other polarization, there is little cross-coupling because the phase matching condition is not satisfied due to the strong birefringence. This way, the two orthogonal polarizations are separated within a short length, which is equal to the coupling length of the polarization mode to be cross-coupled.

A polarization splitter uses a large birefringence in mode index. A short splitter may include two waveguides in the splitter being similar to have high large mode field overlap. In SOI (silicon-on-isolator) optics at telecommunication wavelengths, $\lambda \approx 1.55$ µm, the waveguide core uses Si (silicon) of index of refraction n=3.45, and cladding uses $SiO_2$ (silica) of n=1.46. Two closely spaced Si nano-wires could function as a polarization splitter. In some HAMR applications, light wavelength $\lambda$=0.83 µm, $Ta_2O_5$ (tantalum oxide, n=2.07) may be used as a waveguide core, $Al_2O_3$ (alumina, n=1.63-1.65) and $SiO_2$ (silica, n=1.46) as waveguide cladding layer. Other core materials of higher index of refraction include $TiO_2$ (titanium oxide, n=2.35), $Nb_2O_5$ (niobium oxide, n=2.29), $Si_3N_4$ (silicon nitride, n=2.1), SiC (silicon carbon, n=2.40-2.9), and $Ba_4Ti_3O_{12}$ (barium titanate, n=2.45). The index contrast between core and cladding is low for a polarization splitter.

Figure 3:
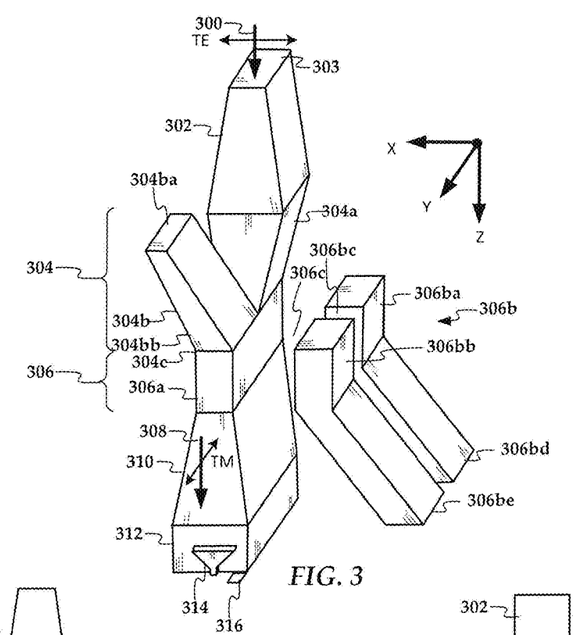
FIGS. 3, 4, and 5 are perspective, end, and side views showing a waveguide system according to an example embodiment.
Figure 4:
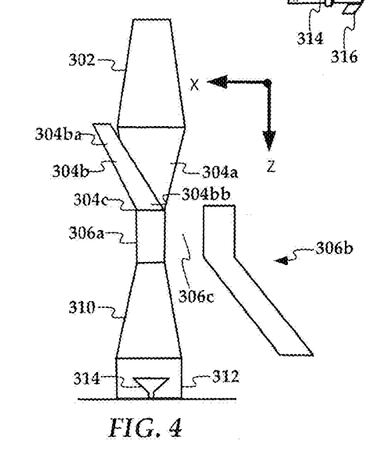
Figure 5:
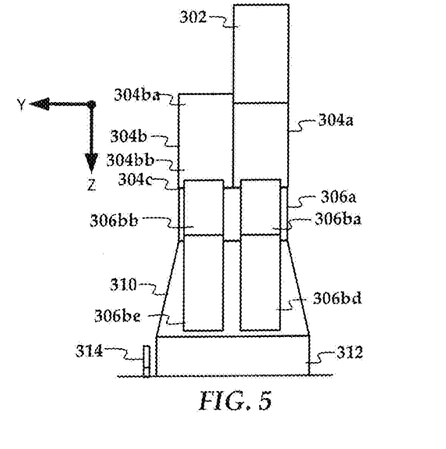
Figures 13, 14, 15:
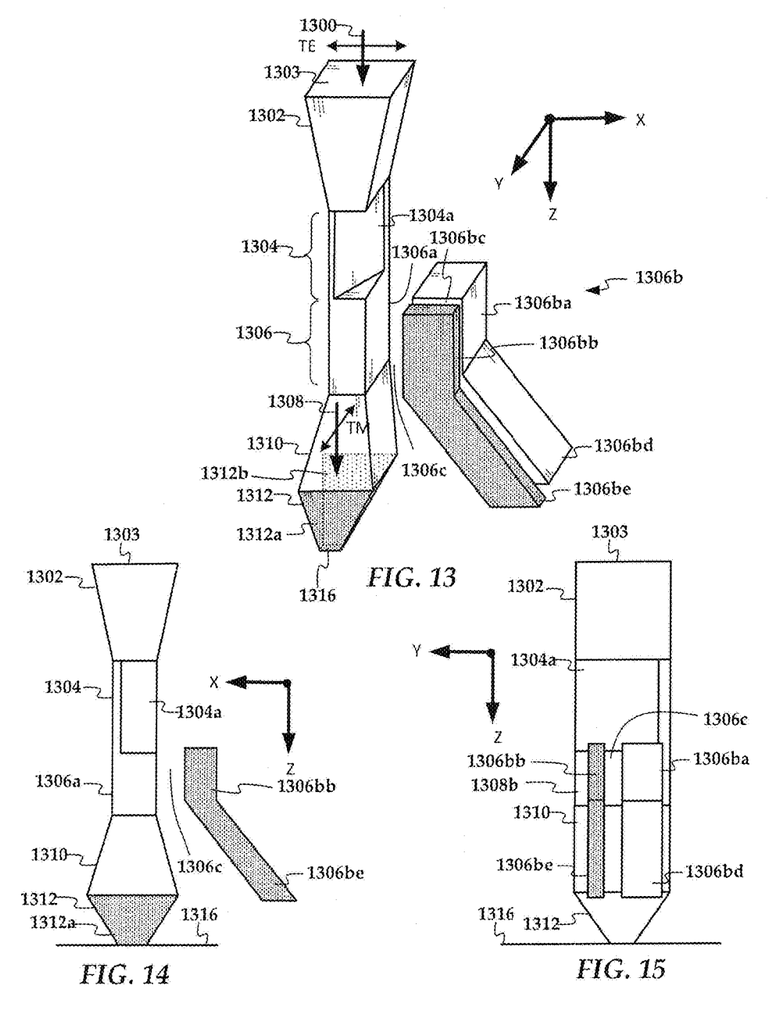
FIGS. 13, 14, and 15 are perspective, end, and side views showing a waveguide system according to another example embodiment.
Figure 21:
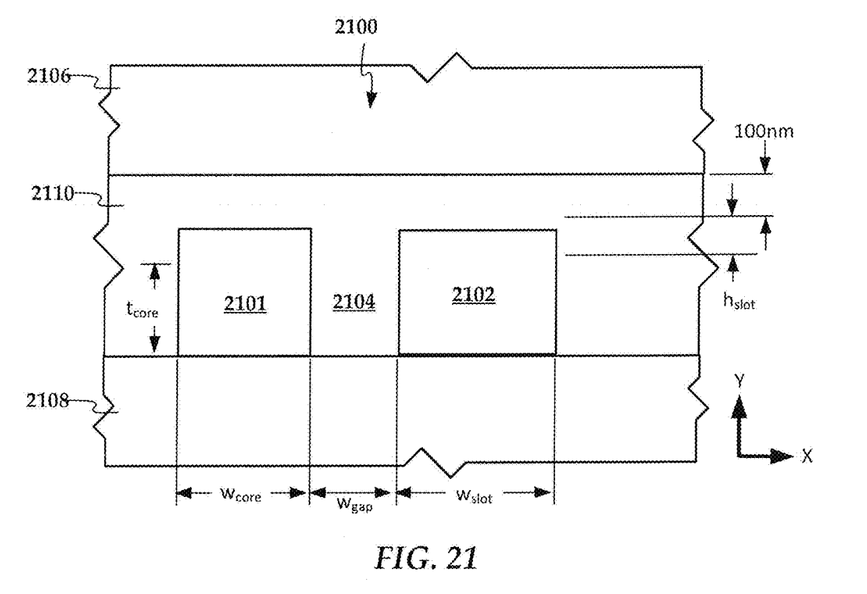
FIG. 21 is a cross-sectional view showing a polarization splitter according to another example embodiment.

As noted above, the polarization splitter 218 may be a slot waveguide, e.g., formed of a thin dielectric layer of low index of refraction sandwiched between two dielectric layers of high refractive index n. An example of this embodiment is shown in FIGS. 3-5. In other embodiments, a slot waveguide splitter may be formed as a dielectric layer of low index between a dielectric layer of high index and a plasmonic metal (Au, Ag, Cu, etc) to achieve high birefringence for polarization splitter. An example of this other slot waveguide embodiment is shown in FIGS. 13-15. Another embodiment is shown in FIG. 21, with a single splitter waveguide that couples to the input channel waveguide in a higher order mode.

In FIGS. 3-5, respective perspective, end, and side views show a waveguide system according to an example embodiment. A TE-polarized light 300 emanating from a light source, such as an edge-emitting laser diode (not shown in the figure) is coupled into a waveguide input coupler 302 (also referred to as a spot size converter) via input surface 303. The waveguide input coupler 302 has narrow width at input surface 303 and becomes wider along the light propagation direction. Coupling of light 300 into the input coupler 302 excites a fundamental TE mode in the waveguide, polarized along the x-direction. This TE mode is intended to be converted into a TM mode, polarized along the y-direction, by a polarization rotator 304.

The polarization rotator 304 has a two-layered structure such that the input TE mode is gradually rotated into a TM mode. Generally this structure includes a first waveguide portion 304a that is joined with the input coupler 302 and a second, offset (or branched) waveguide portion 304b. A first end 304ba of the second, branched waveguide portion 304b is offset from the first portion 304a in the crosstrack direction (x-direction). A second end 304bb of the waveguide portion 304b is crosstrack-aligned and downtrack-offset from the first portion 304a. The waveguide portions 304a-b are joined at output end 304c. Details of this type of polarization rotator can be found in commonly-owned U.S. Pat. No. 9,070,386, which is hereby incorporated by reference.

A polarization splitter 306 includes a channel waveguide section 306a coupled to the polarization rotator 304. The polarization splitter 306 also includes a slot waveguide 306b with two high index channels 306ba, 306bb with a low index gap 306bc in between. The high index channels 306ba, 306bb are separated from the channel waveguide section 306a by a gap 306c and transition away from the channel waveguide portion 306a as indicated by sloped waveguide portions 306bd and 306be. Similar sloped portions may be used on the other end of the channels 306ba-bb (see, e.g., FIG. 7). The polarization splitter 306 transmits the rotated component (e.g., TM-mode component 308) via the channel waveguide section 306a while coupling the residual, unrotated component (e.g., TE-mode component) to a splitter waveguide, in this case the slot waveguide 306b. The slot waveguide 306b directs an unrotated portion of the light 300 away from the media-facing surface 316.

A waveguide taper 310 receives a rotated portion 308 of the light, which is delivered to a near-field transducer 314 via output core section 312. The near-field transducer 314 has an enlarged portion and a peg, and may be placed in a waveguide cladding layer (not shown) above the waveguide core 312 (e.g., the cladding layer is offset from the core 312 in the y-direction). The rotated-mode light 308 (TM-mode in this example) excites the near-field transducer 314. The enlarged portion of the near-field transducer 314 is shown with a triangular shape, although other shapes may be used (e.g., rectangular, circular, parabolic).

Figure 6:
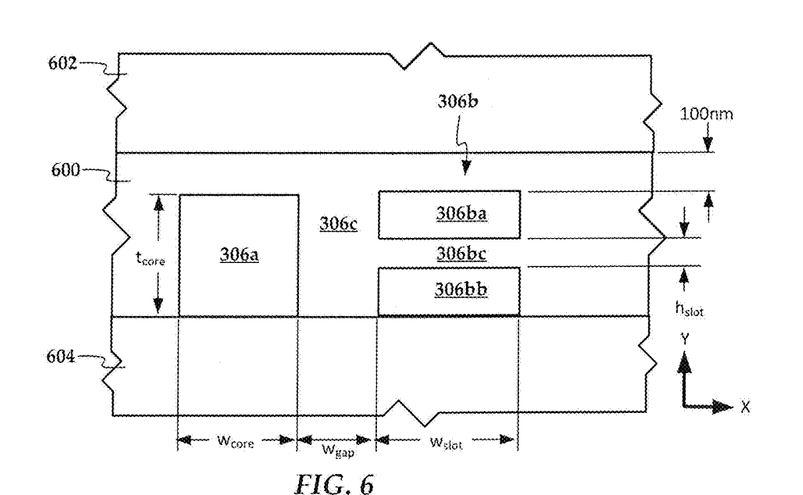
FIGS. 6 and 7 are cross-section views showing parts of the waveguide system of FIGS. 3-5.
Figure 7:
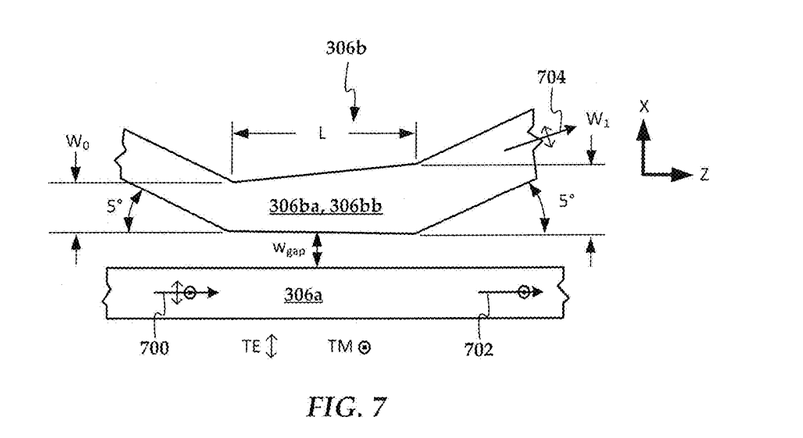

In order to model performance of the arrangement shown in FIGS. 3-5, dimensions were used as shown in the cross sections of FIGS. 6 and 7. As seen in FIG. 6, core sections 306a, 306ba, and 306bb are formed from $Ta_2O_5$, with $Al_2O_3$ (n=1.63) as side cladding 600 and $SiO_2$ (n=1.46) as used for top and bottom cladding layers 602, 604. Light wavelength λ=0.83 μm. The core thickness $t_{core}$ (along the y-direction) is chosen to be 340 nm, a nearly optimal thickness for NFT excitation with a TM mode. The core width $w_{core}$ (along the x-direction) after the TE-to-TM polarization rotator depends on the type of rotator. In the embodiments shown in FIGS. 3-5, core width $w_{core}$ may be about half of core thickness $t_{core}$ while in other embodiments $t_{core}$ and $w_{core}$ may be about the same.

For modeling the dielectric slot waveguide polarization splitter as shown in FIG. 6, core width $w_{core}$ is chosen to be 340 nm. The slot height $h_{slot}$ is varied between 40 and 80 nm in the modeling, and the gap width $w_{gap}$ is varied between 200 and 250 nm. Ends of the splitter waveguide 306b are slowly separated from the channel waveguide 306a as seen in FIG. 7. For simplicity, this modeling uses a waveguide tilting to introduce and bring away the splitter waveguide. Other transitions may be used instead for separating ends of the splitter waveguide from the channel waveguide, such as smooth curves. Moreover, waveguide width tapering ($W_0 \neq W_1$) may be used to relax the fabrication tolerance and also to increase the bandwidth in light wavelength. This tapering will increase the coupling length, L, of the splitter waveguide 306b.

In this figure, arrows 700 and 702 represent respective through-port inputs and outputs, and arrow 704 represents cross-port output. The through-port input 700 includes both TE and TM modes, the through-port output 702 contains (ideally) only TM mode, and the cross-port output 704 contains (ideally) only TE mode. The through-port output 702 is used to excite the NFT, while the cross-port output 704 is directed away from the NFT, and may be used for other purposes noted above.

For a dielectric slot waveguide, the continuity of electric displacement field normal to the interface between two materials causes the electric field to be concentrated into the slot of low index of refraction for a TM mode. This results in the reduction in the effective index of a TM mode that is far greater than that of a TE mode in the presence of a slot. To remove the TE mode from the input waveguide, coupling in the fundamental modes ($TE_{00}$-$TE_{00}$) between the two waveguides may be used. In other embodiments, the coupling between the fundamental mode ($TE_{00}$) propagating along the input waveguide and a higher-order TE mode of the splitter waveguide, such as $TE_{00}$-$TE_{10}$ coupling may be used to remove the TE mode from the input waveguide. The modeling in this example uses $TE_{00}$-$TE_{00}$ coupling because it will yield a shorter splitter, due to similarity in the mode profile between the two waveguides. The graph/plots in FIGS. 8-12 show the results of the modeling.

Figure 8:
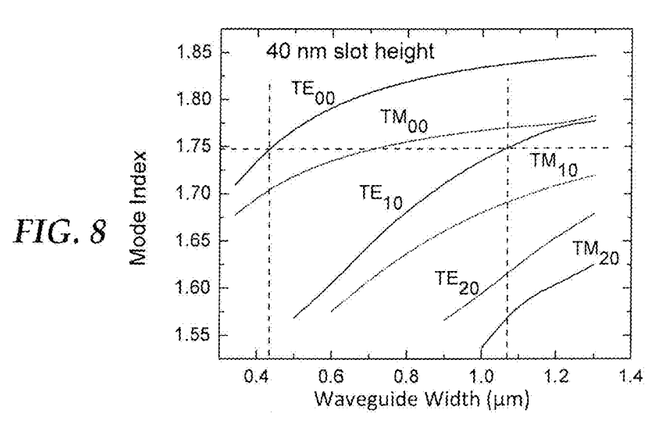
FIGS. 8-12 are plots showing modeling results of the waveguide system of FIGS. 3-7.
Figure 9:
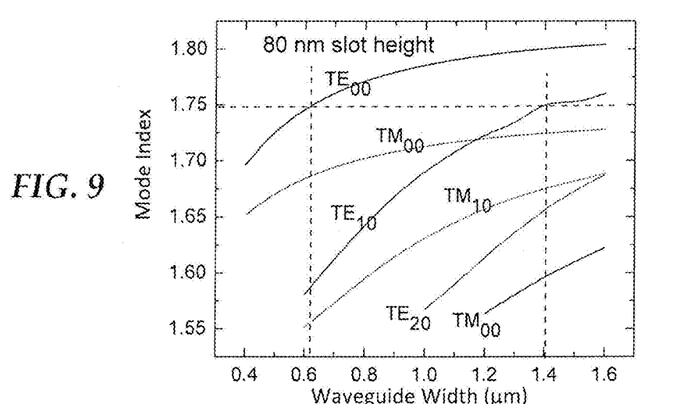

In FIGS. 8 and 9, graphs shows effective indices of all modes supported by the slot waveguide versus slot width at slot height $h_{slot}$=40 and 80 nm, respectively. The horizontal dashed line marks the effective index of the $TE_{00}$ mode of the input waveguide while the vertical dashed lines shows the slot width that satisfies the phase match condition for $TE_{00}$-$TE_{00}$ and $TE_{00}$-$TE_{10}$ coupling, respectively. There will be an optimal slot height for TE/TM mode splitting. On one hand, the birefringence between TE and TM mode does increase with the increasing slot height as shown in FIGS. 8 and 9, which yields negligible coupling in the TM modes between the two waveguides while coupling the TE mode from the input waveguide to the splitter waveguide. On the other hand, the phase match condition for effective coupling between two waveguides means the effective index of the mode to be coupled to be nearly equal between the two waveguides. This increases the core width of the slot waveguide with increasing slot height and the coupling between two waveguides becomes weak. This balance in birefringence and coupling strength leads to an optimal slot height. For the example studied, the slot height is set to be 80 nm.

Figure 10:
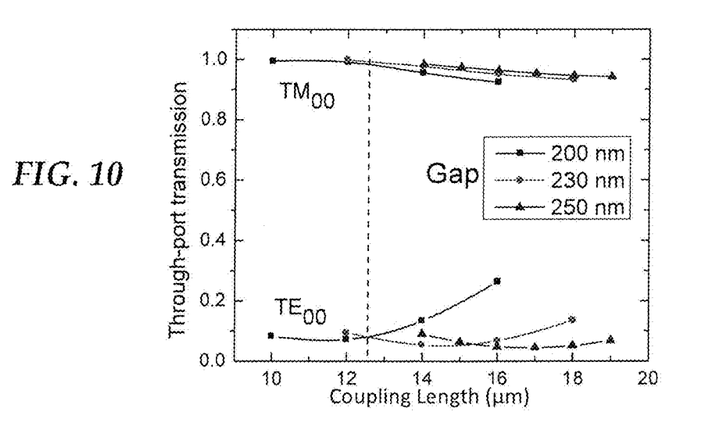

In FIG. 10, a graph shows through-port transmission for TE or TM mode input versus coupling length at three gap widths for slot height $h_{slot}$=80 nm. At this slot height, the phase match condition for the $TE_{00}$-$TE_{00}$ coupling is satisfied at the slot width=0.62 μm, as shown in FIG. 10. For fabrication tolerance and bandwidth, the splitter waveguide is tapered from start width $W_0$=0.57 μm to end width $W_1$=0.67 μm. The separation between two waveguides, $w_{gap}$=200-250 nm, is assumed, which can be fabricated by a current photolithography scanner equipped with a 193 nm UV light source.

Figure 11:
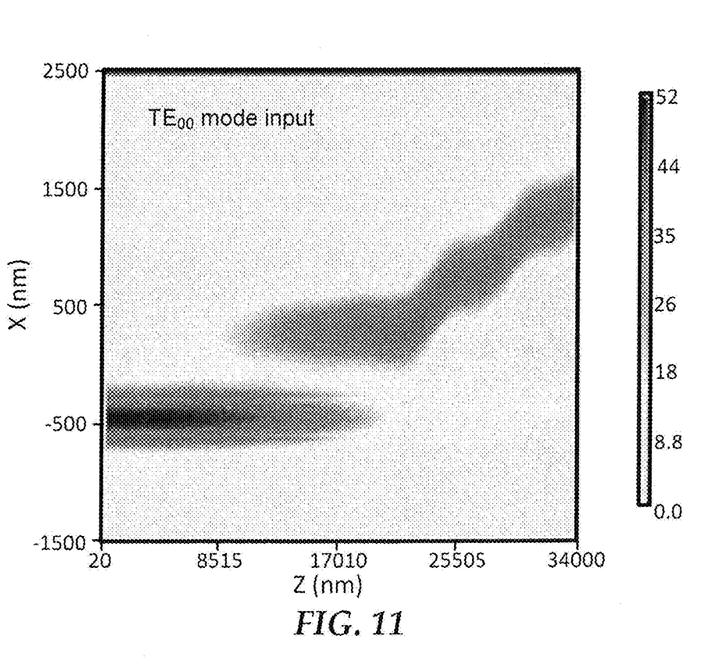
Figure 12:
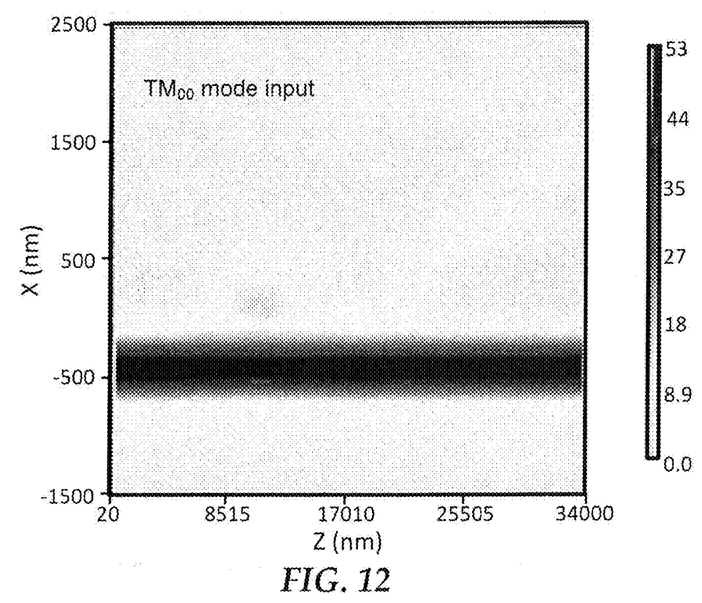

From FIG. 10, it is evident that the through-port transmission for TM mode reaches 99% while the TE transmission is below 5% at the optimal coupling length. If the gap between two waveguides is controlled within 200-230 nm, the TM mode transmission=98% while the TE mode transmission=8%. This means that this polarization splitter removes over 90% TE mode from the input while loses only 2% of the TM mode. In FIGS. 11 and 12, contour plots show profiles of respective $TE_{00}$ and $TM_{00}$ electric field amplitude on an xz-plane through the middle of the channel 306a waveguide at $w_{gap}$=250 nm.

In another embodiment, a hybrid plasmonic slot waveguide can also be used as a polarization splitter, as shown respective perspective, end, and side views of FIGS. 13, 14, and 15. A TE-polarized light 1300 emanating from a light source, such as an edge-emitting laser diode (not shown in the figure) is coupled into a waveguide input coupler 1302 (also referred to as a spot size converter) via input surface 1303. The waveguide input coupler 1302 has wide width at input surface 1303 and becomes narrower along the light propagation direction. Coupling of light 1300 into the input coupler 1302 excites a fundamental TE mode in the waveguide, polarized along the x-direction. This TE mode is intended to be converted into a TM mode, polarized along the y-direction, by a polarization rotator 1304.

The polarization rotator 1304 is a waveguide core section with a triangular structure (e.g., angled face 1304a extending along the z-direction) such that the optical axis of the structure is 45 degrees from X axis. Details of this type of polarization rotator can be found in commonly-owned U.S. Patent Publication 2013/0108212 which is hereby incorporated by reference. In other embodiments, the angled 1304a may be configured to form a trapezoidal cross-section in the xy-plane instead of a triangular cross-section. The input TE mode is decomposed into the two eigen-modes of the triangular structure with equal intensity at the start of the rotator 1304. The two eigen-modes propagate along the triangular structure independently at their respective phase velocities. As the phase difference between the eigen-modes reaches π, the rotator ends and the input TE mode becomes a TM mode of a connecting channel waveguide 1306a, which is part of polarization splitter 1306. The polarization rotation is usually not perfect, due to various reasons, such as tight dimension tolerance in the rotator and imperfect fabrication. It is not uncommon to leave 10% TE mode at the end of the rotator 1304.

The polarization splitter 1306 includes a slot waveguide 1306b with a high index channel 1306ba and a plasmonic film channel 1306bb with a low index gap 1306bc in-between. The channels 1306ba, 1306bb are separated from the channel waveguide section 1306a by a gap 1306c and transition away from the channel waveguide portion 1306a as indicated by sloped waveguide portions 1306bd and 1306be. The polarization splitter 1306 couples an unrotated portion of the light 1300 away from the media-facing surface 1316. The polarization splitter 1306 transmits the rotated component (e.g., TM-mode component 1308) via the channel waveguide section 1306a while coupling the residual, unrotated component (e.g., TE-mode component) away to a splitter waveguide, which in this case is the hybrid plasma slot waveguide 1306b.

A waveguide taper 1310 receives a rotated portion 1308 of the light, which is delivered to a near-field transducer 1312. The near-field transducer 1312 uses gap plasmon excitation, which is formed by tapering the waveguide core with a plasmonic metal (such as Au, Rh, Ir, Pd, Pt) that covers opposing surfaces 1312a-b of the core or surrounds the core on all sides thereby forming an aperture. The TM mode will excite surface plasmons at the interface between the core and plasmonic metal 1312a-b. Note that in other embodiments, a near-field transducer 1312 as shown in FIG. 13 may be used with a different polarization rotator and splitter, e.g., rotator 304 and splitter 306 as shown in FIG. 3. Similarly, the polarization rotator 1304 and polarization splitter 1306 shown in FIG. 13 may be used with a different near-field transducer, e.g., a near-field transducer configuration 314 shown in FIG. 3, and variations thereof described above.

The hybrid plasma slot waveguide 1306b provides giant birefringence between TE and TM mode. A TM mode, with its electric field polarized normal to a plasmonic metal of negative permittivity, such as Au, Ag, Pt, Pd, Ir, Rh, and Cu, will excite surface plasmons propagating along the interface between the metal 1306bb and the slot 1306bc. The TM mode index is greater than the refractive index of the dielectric core 1306ba, for instance, $Ta_2O_5$ in this example.

Two issues arise in this configuration: one is light absorption in the plasmonic metal and the other one is the plasmonic metal induced TE-TM conversion. Light absorption depends on the light wavelength and the plasmonic material. At HAMR wavelength λ≈830 nm, the light absorption could cause as high as 10% loss in the TM mode transmission through the polarization splitter 1306 with Au as the plasmonic metal. The plasmonic metal induced TE-TM conversion could be minimized, for instance, using geometry anisotropy in the cross-section of the channel waveguide 1306a such that the effective index of TM mode is significantly different from that of TE mode. However, this might increase the coupling length and therefore extra loss in the TM mode transmission.

Figure 16:
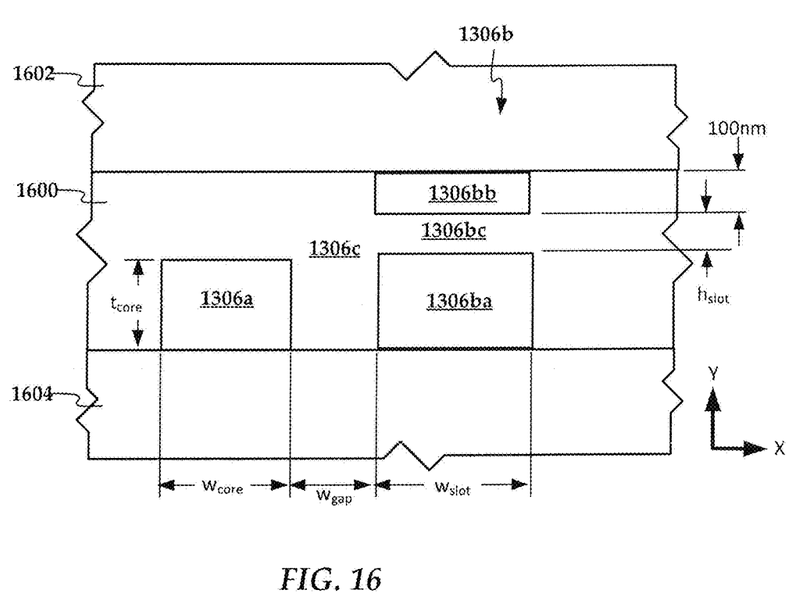
FIG. 16 is a cross-section view showing parts of the waveguide system of FIGS. 13-15.

In FIG. 16, a cross-sectional view shows dimensions used in a model of the hybrid plasma slot waveguide 1306b. Dielectric core sections 1306a and 1306ba are formed from $Ta_2O_5$, with $Al_2O_3$ (n=1.63) as side cladding 1600 and $SiO_2$ (n=1.46) as used for top and bottom cladding layers 1602, 1604. The plasmonic channel 1306bb is Au. This example uses $w_{core}$=440 nm and $t_{core}$=340 nm in the channel waveguide 1306a. This geometry asymmetry in the cross section of the channel waveguide 1306a is chosen to prevent the TE-TM conversion through the plasmonic layer such that there is large difference in the effective index between TE and TM mode. The effective index is 1.798 for the $TE_{00}$ mode and 1.772 for the $TM_{00}$ mode.

Figure 17:
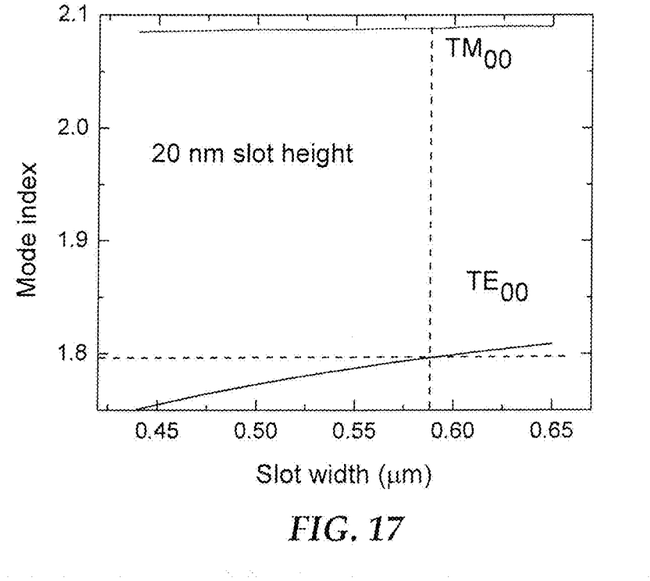
FIGS. 17-20 are plots showing modeling results of the waveguide system of FIGS. 13-16.

The separation between two waveguides is $w_{gap}$=200 nm. No tapering is used in the splitter waveguide, $W_0$=$W_1$=0.59 µm (see FIG. 7). Effective indices of the $TE_{00}$ and $TM_{00}$ supported by the slot waveguide versus slot width at slot height=20 nm. Results of modeling this configuration are shown in the graphs/plots of FIGS. 17-22. In FIG. 17, effective mode index is shown as a function of slot width $w_{slot}$. The horizontal dashed line marks the effective index of the $TE_{00}$ mode of the channel waveguide 1306a while the vertical dashed line shows the slot width that satisfies the phase match condition for $TE_{00}$-$TE_{00}$ coupling.

Figure 18:
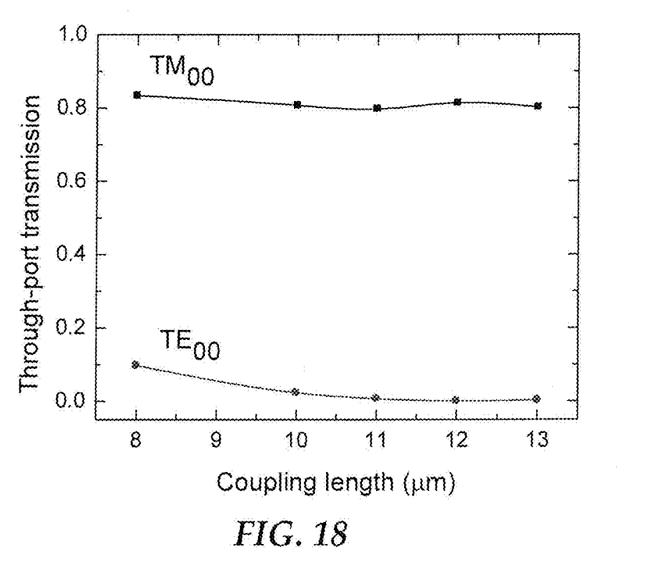
Figure 19:
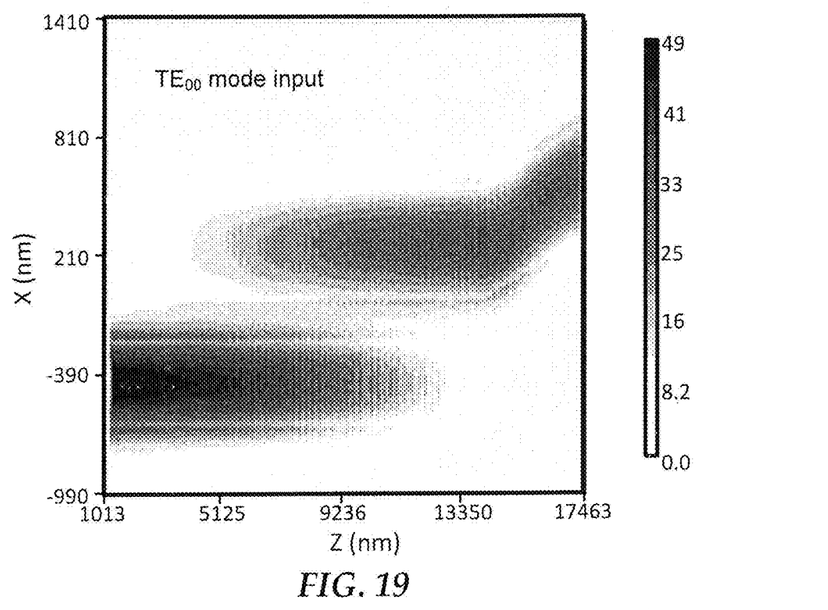
Figure 20:
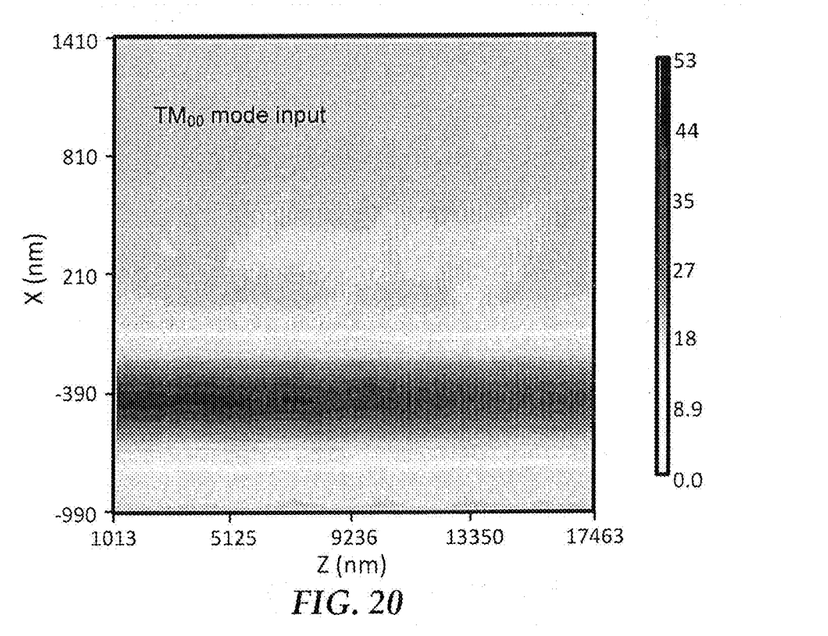

In FIG. 18, a graph shows through-port transmission for the $TE_{00}$ and $TM_{00}$ mode input versus coupling length. In FIGS. 19-20, contour plots show profiles of electric field amplitude on an xz-plane through the middle of the channel waveguide 1306a. The polarization splitter yields ~80% through-port transmission in TM mode while the TE mode through-port transmission is below 0.1%. The TM-to-TE conversion is also low, ~1%. Comparing to the dielectric slot waveguide splitter, the hybrid plasmonic slot waveguide splitter has 10× greater suppression to TE mode, but with ~20% loss in TM mode.

Another embodiment of a polarization splitter 2100 is shown in the cross-sectional view of FIG. 21. A channel waveguide core 2101 is located cross-track from a splitter waveguide core 2102. A gap 2104 separates the waveguide cores 2101, 2102. In one embodiment, the cores 2101, 2102 are formed from $Ta_2O_5$, with $Al_2O_3$ as side cladding 2110 and $SiO_2$ (n=1.46) as used for top and bottom cladding layers 2106, 2108. Viewed from the side, the waveguide cores 2101, 2102 appear similar to channel waveguide 306a and one of the splitter gap waveguide cores 302ba, 306bb shown in FIG. 7. The polarization splitter 2100 may be used with any polarization rotator described above, e.g., rotator 304 shown in FIG. 3 or rotator 1304 shown in FIG. 13. Similarly, the polarization splitter 2100 may be used with the different waveguide delivery and near field transducer configuration shown in FIGS. 3 and 13 and described elsewhere herein.

Figure 22:
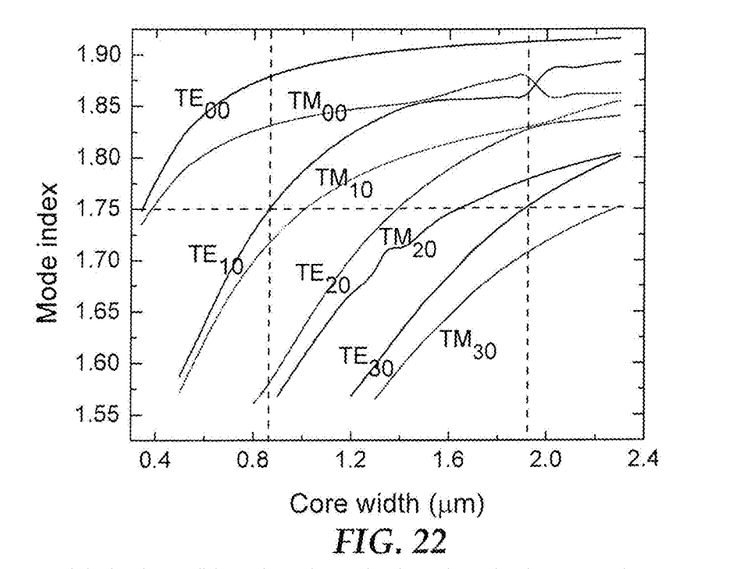
FIGS. 22-25 are plots showing modeling results of a waveguide system using the splitter shown in FIG. 21.
Figure 23:
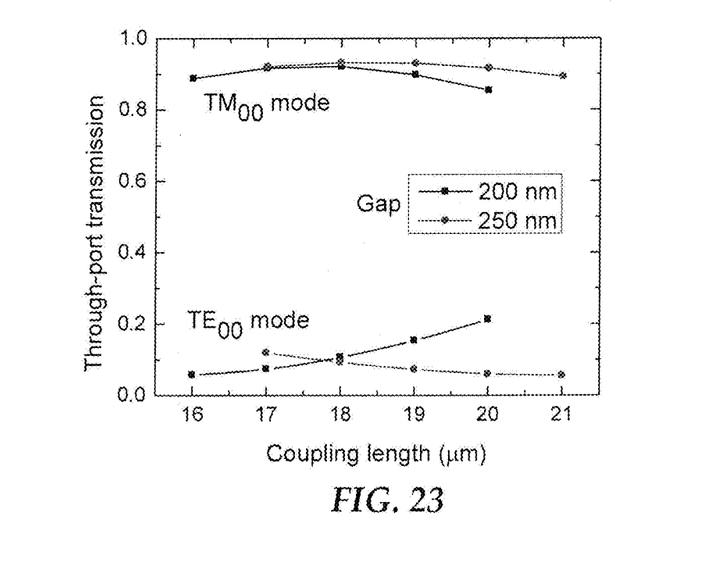
Figure 24:
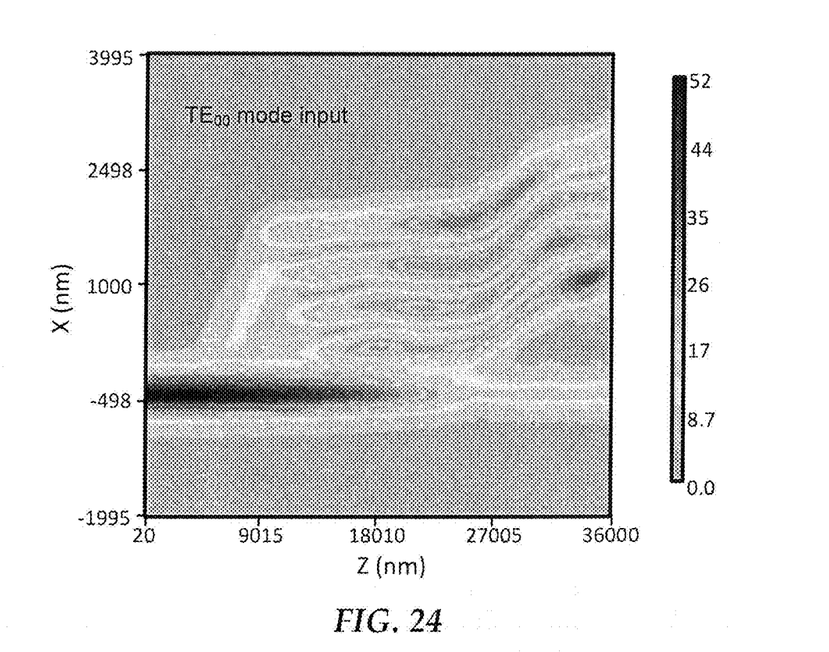
Figure 25:
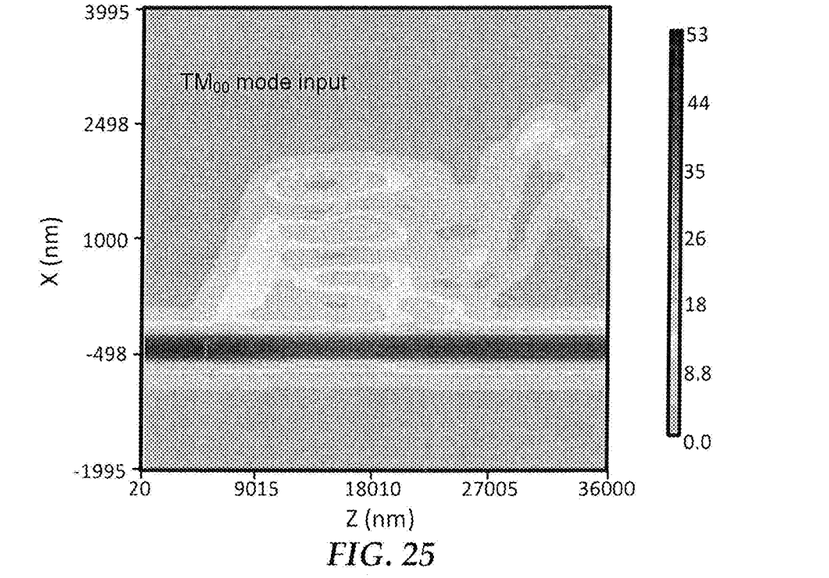

This polarization splitter 2100 uses the coupling between a $TE_{00}$ mode (the fundamental transverse electric mode) propagating along the input waveguide and an odd, higher-order TE mode, $TE_{n0}$, supported by the splitter waveguide. The graphs/plots show in FIGS. 22-25 shown results of modeling this configuration. The graph of FIG. 22 shows effective indices of all modes supported by the splitter waveguide versus core width $w_{core}$. The horizontal dashed line marks the effective index of the input $TE_{00}$ mode while the two vertical dashed lines show the splitter core widths that satisfy the phase match condition for $TE_{00}$-$TE_{10}$ and $TE_{00}$-$TE_{30}$ coupling, respectively. The graph in FIG. 23 shows through-port transmission of $TE_{00}$ and $TM_{00}$ mode input versus coupling length at $w_{gap}$=200 and 250 nm and with $TE_{00}$-$TE_{30}$ mode coupling. The contour plots in FIGS. 24 and 25 show profiles of electric field amplitude on a xz-plane through the middle of the channel waveguide 2101. These results are for $TE_{00}$-$TE_{30}$ mode coupling and $w_{gap}$=250 nm.

As these results show, with increasing mode order n, the birefringence between $TE_{n0}$ and $TM_{n0}$ increases. It is preferred to use an odd higher-order because it yields greater coupling between two waveguides at narrower separation for shorter coupling length. There will be an optimal mode order to yield high TM mode and low TE mode transmission. Modeling showed that a configuration with $TE_{00}$-$TE_{10}$ coupling does remove over 90% $TE_{00}$ mode from input waveguide but the through-port transmission for the $TM_{00}$ mode is only 49%. The coupling length L is short, only about 10 µm. The results in FIGS. 23-25 show the characteristics of a splitter that uses $TE_{00}$-$TE_{30}$ mode coupling. The splitter waveguide is tapered from $W_0$=1.8 µm to $W_1$=2.0 µm. The $TE_{00}$-$TE_{30}$ mode coupling could remove over 90% $TE_{00}$ mode and with ~92% through-port transmission in $TM_{00}$ mode for $w_{gap}$=200-250 nm.

Figure 26:
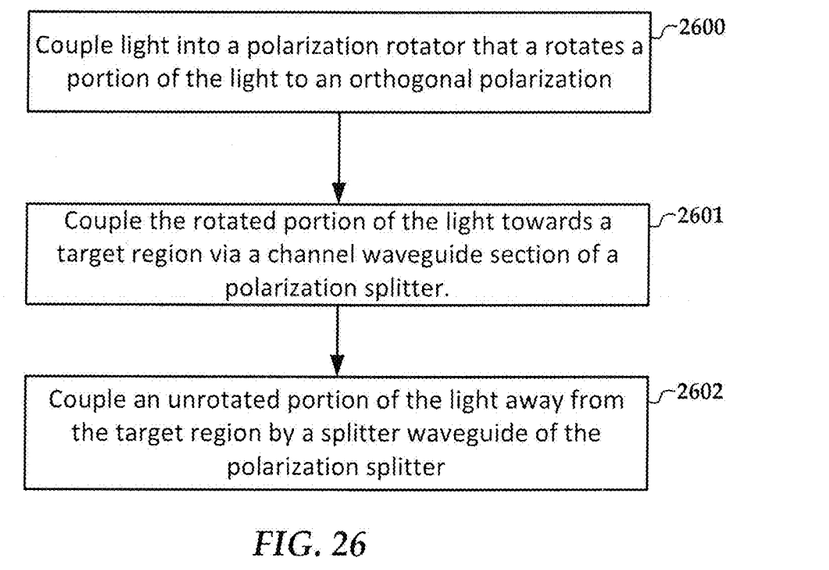
FIG. 26 is a flowchart of a method according to an example embodiment.

In FIG. 26, a flowchart shows a method according to an example embodiment. The method comprises coupling 2600 light from an input surface into a polarization rotator that rotates a portion of the light to an orthogonal polarization (e.g., from a TE mode to a TM mode). The rotated portion of the light is coupled 2601 towards a target region (e.g., NFT) via a channel waveguide section of a polarization splitter. An unrotated portion of the light is coupled 2602 away from the target region by a splitter waveguide of the polarization splitter. The splitter waveguide is separated from the channel waveguide section by a dielectric gap. The coupling of the unrotated portion away from the target region prevents unwanted heating and stray light effects (e.g., on parts of a recording head) that would otherwise be caused by the unrotated portion.

In summary, a polarization splitter is proposed to remove the undesired TE mode from the light path integrated with a TE-to-TM mode converter. The splitter may use a dielectric slot waveguide, a hybrid plasmonic slot waveguide, or the coupling between the $TE_{00}$ of the input waveguide and an odd higher-order TE mode of the splitter waveguide. A polarization splitter that uses a vertical dielectric slot waveguide removes over 90% of TE mode while loses only couple of percent of TM mode. A polarization splitter with a hybrid plasmonic slot waveguide could suppress almost all of TE mode but with some losses in TM mode. A polarization splitter with $TE_{00}$-$TE_{n0}$ (n>1) mode coupling can also remove over 90% TE mode with only 8% loss in TM mode.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. An apparatus comprising:
    a polarization rotator that rotates a portion of light received from an input surface to an orthogonal polarization, the rotated portion of the light and an unrotated portion of the light being transmitted to an output end of the polarization rotator; and
    a polarization splitter coupled to the polarization rotator, the polarization splitter comprising:
        a channel waveguide section having a first end aligned with and connected to the output end of the polarization rotator, the channel waveguide receiving the rotated and unrotated portions of the light and transmitting at least the rotated portion of the light towards an output surface; and
        a splitter waveguide separated from the channel waveguide section by a dielectric gap, the splitter waveguide coupling the unrotated portion of the light out of the channel waveguide and away from a target region of the output surface.

2. The apparatus of claim 1, wherein a phase matching condition between the channel waveguide and the splitter waveguide is nearly satisfied for an original polarization of the unrotated light, wherein the phase matching condition is not satisfied of the orthogonal polarization due to a strong birefringence in a mode index between the original polarization and the orthogonal polarization.

3. The apparatus of claim 1, wherein the polarization splitter comprises a slot waveguide, the slot waveguide comprising two channels with a gap of low-index dielectric material therebetween, at least one of the channels comprising a high-index material dielectric.

4. The apparatus of claim 3, wherein both of the two channels comprise the high-index dielectric material.

5. The apparatus of claim 3, wherein the polarization rotator comprises a branched waveguide portion that is offset from a first waveguide portion that receives the light from the input surface.

6. The apparatus of claim 4, wherein the channel waveguide transmits the rotated portion of the light to a near-field transducer at the target region, the near-field transducer comprising an enlarged portion and a peg extending towards the output surface.

7. The apparatus of claim 3, wherein one of the two channels comprise a plasmonic metal film.

8. The apparatus of claim 7, wherein the polarization rotator comprises a triangular or trapezoidal waveguide core section.

9. The apparatus of claim 7, wherein the channel waveguide transmits the rotated portion of the light to a near-field transducer at the target region, the near-field transducer comprising a tapered waveguide core with plasmonic metal covering at least two opposed surfaces of the tapered waveguide core.

10. The apparatus of claim 1, wherein the splitter waveguide comprises a waveguide core that couples with the channel waveguide to support an odd, higher-order coupling mode of the unrotated portion of the light received at the input surface, the odd-higher order coupling mode supporting birefringence with a corresponding odd, higher-order coupling mode of the rotated portion of the light.

11. The apparatus of claim 10, wherein the odd, higher order mode is of order three or greater.

12. The apparatus of claim 1, wherein the splitter waveguide comprises at least one end portion that gradually extends away from the channel waveguide.

13. An apparatus comprising:
    a polarization rotator that rotates a portion of light received from a transverse electric (TE) mode to a transverse magnetic (TM) mode; and
    a polarization splitter coupled to the polarization rotator, the polarization splitter comprising:
        a channel waveguide section that transmits the TM mode portion of the light towards a near-field transducer; and
        a slot waveguide separated from the channel waveguide section by a dielectric gap, the slot waveguide comprising two channels with a gap of low-index dielectric material therebetween, at least one of the channels comprising a high-index material dielectric, the slot waveguide coupling a TE mode portion of the light away from the near-field transducer.

14. The apparatus of claim 13, wherein both of the two channels comprise the high-index dielectric material, and wherein the polarization rotator comprises a branched waveguide portion that is offset from a first waveguide portion that receives the light in the TE mode.

15. The apparatus of claim 14, wherein the near-field transducer comprising an enlarged portion and a peg extending towards a media-facing surface.

16. The apparatus of claim 13, wherein one of the two channels comprises a plasmonic metal film and wherein the polarization rotator comprises a triangular waveguide core section.

17. The apparatus of claim 16, wherein the near-field transducer comprises a tapered waveguide core with plasmonic metal covering at least two opposed surfaces of the tapered waveguide core.

18. An apparatus comprising:
a polarization rotator that rotates a portion of light received from a transverse electric (TE) mode to a transverse magnetic (TM) mode, the rotated portion of the light and an unrotated TE mode portion of the light being transmitted to an output end of the polarization rotator; and
a polarization splitter coupled to the polarization rotator, the polarization splitter comprising:
a channel waveguide section having a first end aligned with and connected to the output end of the polarization rotator, the channel waveguide section receiving the rotated and unrotated TE mode portions of the light and transmitting at least the rotated portion of the light towards a near-field transducer; and
a waveguide core separated from the channel waveguide section by a dielectric gap, the waveguide core coupling with the channel waveguide to support a higher-order TE coupling mode that supports birefringence with a corresponding higher-order TM coupling mode, the waveguide coupling the unrotated TE mode portion of the light out of the channel waveguide and away from the near-field transducer.

19. The apparatus of claim 18, wherein the channels of the slot waveguides each comprise at least one end portion that gradually extends away from the channel waveguide.

20. The apparatus of claim 18, wherein the polarization rotator comprises a branched waveguide portion that is offset from a first waveguide portion that receives the light in the TE mode, and wherein the near-field transducer comprising an enlarged portion and a peg extending towards a media-facing surface.

* * * * *